Feb. 2, 1960 J. MANTELET 2,923,483
COFFEE AND SIMILAR GRINDING MILL
Filed Feb. 27, 1957 2 Sheets-Sheet 1
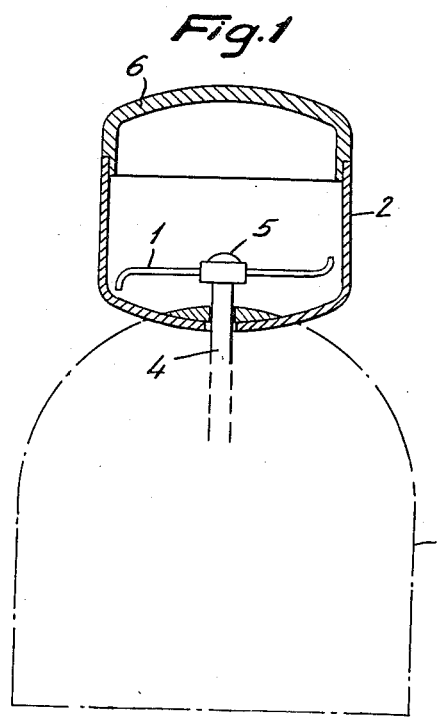
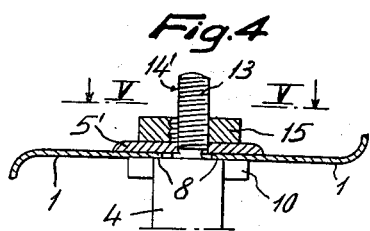
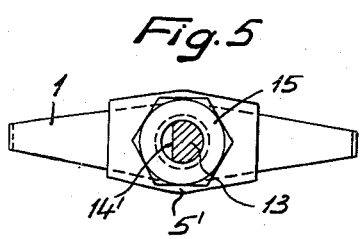
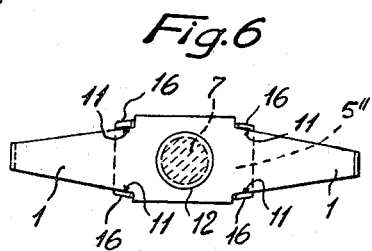
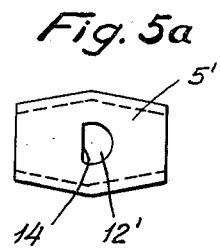
INVENTOR
JEAN MANTELET Feb. 2, 1960          J. MANTELET        2,923,483
COFFEE AND SIMILAR GRINDING MILL
Filed Feb. 27, 1957                          2 Sheets-Sheet 2
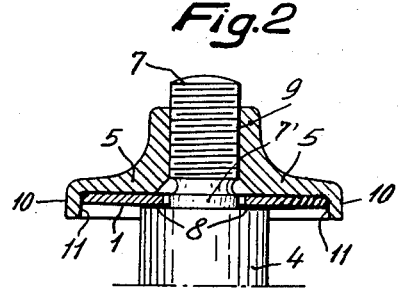
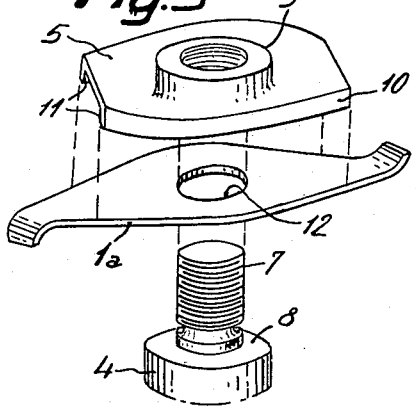
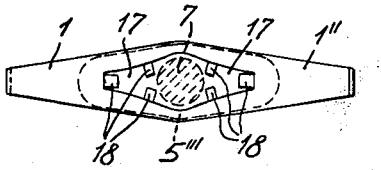
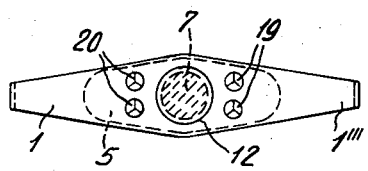
INVENTOR
JEAN MANTELET ance, a corporation of France

United States Patent Office 2,923,483
Patented Feb. 2, 1960

2,923,483

COFFEE AND SIMILAR GRINDING MILL

Jean Mantelet, Bagnolet, France, assignor to Société d'Etude et d'Exploitation Chimie et Mécanique E.C.E. M-Legumex (Société à Responsabilité Limitée), Bagnolet, France, a corporation of France Application February 27, 1957, Serial No. 642,733

Claims priority, application France April 20, 1956

7 Claims. (Cl. 241—191)

This invention relates to grinding machines of the type wherein at least one rotatably driven blade is used, and especially to coffee grinding mills including a receptacle in which a cutter fastened onto a motor shaft rotates at high speed.

The cutter blade is generally 1.0 to 1.5 millimeters thick, and is fixed to the motor shaft for rotation therewith by forming the shaft with a shoulder whereon said blade is tightened by screw and nut means and by forming the end portion of the shaft, which protrudes from the shoulder through an aperture in the blade, with a flat extending parallel to the shaft axis over the length of the shaft end portion which engages a corresponding straight edge portion of the aperture. Such a "flat keying" needs a blade thickness substantial enough, because, during operation of the apparatus at a speed of 10,000 to 12,000 r.p.m., the bearing pressure of the cutter blade on the flat surface of the shaft must not exceed the crushing-strength of the latter.

Furthermore the shaft and the blade steel used must be of similar hardness that the harder one is not to cut the softer. For this reason, substantially thick blades are used, the cutting edges of which are sharpened by means of a bevel, in order not to overload the electric motor and to get a better grinding efficiency. But this bevel wears out gradually, the cutter efficiency decreases, while the grinding time increases and the motor becomes overloaded. As a result, the common type coffee grinding mill, after a certain service life, wears out very fast.

Moreover, the cutter blade digs in the metal of the shaft, on the flat face of the shaft end, and this has a quite unfavourable effect on the maintenance because this results in play between shaft and blade, resulting in a lack of rotational balance, and substantial vibrations of the machine, which further speeds up also the motor failure.

At the end, the machines of this type are not giving an even crushing, and the final thinness of the ground product is quite variable: as a matter of fact, the impact effect on a lump to be crushed is the less efficient as the contact impact area of the blade is larger, and a thick blade must therefore hurt the material more often than a thinner blade, which increases the grinding time on the one hand, and increases the percentage of not properly ground material, on the other hand.

The present invention obviates these disadvantages. With this object in view, the present invention mainly consists in a high-speed cutting or grinding apparatus which includes a shaft with an end portion of a given diameter and adapted to be rotated at high speed about its axis. A thin cutting blade formed with a central aperture of substantially the same cross section through the whole thickness of the blade is mounted on the shaft with an end portion of the latter protruding with clearance through the aperture. Means are further provided which are fixed to the shaft and engage the mounted blade at points spaced from the shaft axis a distance greater than the radius of the end portion thereof to center the blade aperture with respect to the shaft and to connect the blade with the shaft for rotation therewith without the edge of the aperture in the blade engaging the shaft end portion. Preferably, a shoulder is formed where the shaft end portion joins the remainder of the shaft, and one face of the blade is pressed by the connecting and centering means against this shoulder on the shaft. The end portion may be screw-threaded and the means for centering and connecting the blade to the shaft are preferably screwed onto the threaded shaft end portion. Preferably, the blade is made from a material harder and the centering and connecting means from a material softer than the material of the shaft. In this way, damaging of the shaft by the inner blade edge, during extended use of the apparatus, is definitely prevented.

It is then possible to develop a driving contact area, between the driving plate and the cutter blade edge, large enough to considerably reduce the metal fatigue on the abutting surfaces. Moreover, as the necessary motor torque during grinding is substantially constant for a same work to be performed, and as the point where the driving force is applied may be spaced substantially further from the rotation axis than in conventional mills so far known (wherein said point is necessarily at a distance smaller than half the shaft diameter) a considerable decrease of the driving force to be transmitted by the abutting surfaces is obtained according to the invention.

For both reasons, and notwithstanding the important difference in metal hardness existing between the cutter blade and the motor shaft in the machine as per the invention, as well as the smaller thickness of the blade for the same torque to undergo in the grinding operation, the life of this assembly may be greatly lengthened, either by increasing the contact area on the corresponding cutter and plate abutting surfaces, or by increasing the distance from the motor shaft axis to the driving point on the cutter, until the fatigue over said abutting faces is reduced to the desired value.

According to another feature of the invention, the face of each projection on the plate which comes in contact with the cutter blade edge is chamfered in such a way to cause self-centering of the cutter blade with respect to the motor shaft.

The use of centering means allows a perfect balance of the blade, whereas any contact between the very hard metal of the latter with the softer metal of the shaft may be avoided.

And the use of a metal for the plate softer than the shaft metal and of course than the blade metal, makes it quite sure that the wearing part of this assembly is the plate, and saves the cutter and the motor shaft which are so fully protected.

The final result obtained with the invention is a reduction of 30 to 50% of the grinding time for the same work to do, while the total life of such a grinder is many times extended.

Other features will become apparent from the following description and the attached drawing wherein:

Fig. 1 is a diagrammatical vertical cross-section of a grinding mill according to the invention, Fig. 2 is a longitudinal section of the cutter fastening assembly, Fig. 3 is an exploded perspective view of the assembly of Fig. 2, Fig. 4 is a sectional view of a variant of the cutter assembly, Fig. 5 is a plane view along V—V of Fig. 4, Fig. 5a is a plane view of the driving plate shown in Figs. 4 and 5, Fig. 6 is a plane view of a variant in the assembly, Figs. 7 and 8 are variants of Fig. 6.

The Fig. 1 shows a grinding machine including a cutter 1, mounted rotary in a receptable, or bowl 2, located at the upper end of a base frame 3. The cutter 1 is rotatably driven at a high speed of about 10,000 to 15,000 r.p.m., through a motor shaft 4 whereupon the cutter is fixed by a fastening means 5 hereunder described. The grinding receptacle or bowl 2, is substantially hermetically closed by a cover or cap 6, preferably of transparent plastic material. The base 3 contains the shaft 4 drive apparatus, including an electric motor and eventually a transmission device, which are of the conventional type so far known and not illustrated.

Fig. 2 shows in a sectional view how the cutter is fixed onto the shaft 4, by means of the driving plate 5, in a grinding mill according to the invention. The motor shaft end is machined so as to present a threaded terminal portion 7, the diameter of which is smaller than the shaft diameter, so as to provide in the embodiment described an annular bearing face 8, which constitutes the shoulder for the cutter 1. The driving plate 5 is made of a piece of soft steel sheet 1.0 to 1.2 millimeters thick in the example, the central part of which has been drilled so as to provide an aperture 9, in form of a sleeve and threaded. The two side edges 10 of the driving plate or slab are bent downwards, so as to come and locate, when assembled, close to both corresponding edges of the cutter 1. The inner faces of said bent edges 10 are respectively chamfered so as to engage the cutter edges, when tightening the threaded sleeve 9 on the threaded shaft end 7 by screwing; this obliges said cutter 1 to self-center on the axis of the shaft 4. No lack of balance may occur, which would result in vibrations, dangerous because of the high rotational speed. And no contact will develop between the cutter 1 and the traversing shaft end.

The cutter 1 is, in the machine according to the invention, a blade of spring steel, quenched and tempered, of high hardness, with a tensile strength comprised between 180,000 and 220,000 p.s.i.; the blade thickness is about .3 to .4 millimeter; the shaft 4 is made of medium-hard steel quality of the ordinary type used for machine shafts.

To prevent, during the rotational movement at high speed, the cutter blade from bearing on the shaft, in the plane of the centrifugal force, assembling the cutter to the shaft 4 is, according to the invention, made through a driving plate 5, which bears with its threaded portion 9 on the corresponding threaded part 7 of the shaft end, and presses the cutter 1 against the shoulder 8 of the shaft 4, while the chamfers 11 of the bent edges 10 of the driving plate 5 are centering the aperture 12, circular for instance, provided in the central portion of said cutter, with respect to the axis of the shaft 4 end. No contact may then occur, in normal service, between the shaft and the hard steel edge of the cutter 1. Fig. 2 shows clearly that this assembly will not allow the cutter 1 to contact the shaft end portion 7.

Fig. 3 shows a dismantled assembly in an exploded perspective view.

Figs. 4 and 5 show respectively in a vertical section and in a sectional view along V—V of Fig. 4 another way of assembling the cutter 1 onto the shaft 4, wherein the driving plate 5′ includes also bent edges 10, but is provided in its center with an aperture 12′ drilled and not threaded, and including a flat surface 14. A corresponding flat surface 14 is machined on the threaded end portion 13 of the motor shaft 4 so as to interlock said cutter and said shaft in a predetermined direction of a plane normal with the axis of the shaft 4. A nut 15, ordinary or recessed, is screwed on the threaded end 13 of the shaft, so as to tighten the driving plate 5′ and the cutter 1 onto the shoulder 8 of said shaft 4. The plate is simpler in this example, but the use of a separate nut 15 obliges to provide for additional means to set the angular position of the blade with respect to the shaft, as illustrated by the flat 14. But it will be noticed that, here too, no abutment will develop between the hard cutter and the softer shaft.

At Fig. 6, a cutter 1′ has been illustrated, which is set in proper location by means of four turned down prongs 16 provided on the sides of a plate 5″ similar to those hereabove described. As a matter of fact, turned down prongs 16 are just a variant of the bent down edges 10, and are easier to fit.

The location of the traversing shaft end 7 has also been indicated at Fig. 6 in relation with the aperture 12, provided for such a purpose in the cutter 1 body, the concentricity of both circular contours being obtained as explained above, by the centering effect of the chamfer 11 machined on the inner face of each prong 16.

Figs. 7 and 8 are variant embodiments of this arrangement, illustrated through the same diagrammatical drawing as in Fig. 6, wherein the clamp means, instead of being turned down on the side edges of the plate 5, are built-up on the underside of said plate, or are conveniently punched in the blade, so as to engage and maintain the cutter 1″ by the inner edges of corresponding apertures provided in the cutter body, instead of engaging the outer edges of said body.

At Fig. 7, the aperture 17 in the cutter has been widely enlarged in order to allow the built-up, or punched-in prongs 18 to engage with the edge of said aperture 17, and key the cutter 1 relatively to the shaft 4, by means of the plate 5‴, in the rotational grinding movement.

In a similar way, at Fig. 8, four auxiliary apertures 19 have been provided in the cutter 1‴, in addition to the central aperture 12, substantially symmetrical with regard to both axis of symmetry of the cutter plane portion, and built-up or stamped projecting prongs 20, pyramidal or conical in the example, project respectively into apertures 19 so as to facilitate the above-mentioned centering.

The grinding machine according to the described invention provides, when compared with so far known devices of this type, for considerable improvements in manufacture and service; the blade being about three to four times thinner than the conventional cutters gives a perfect homogeneity of the ground material, and a quite shorter grinding time, other things being equal. This is due to the fact that the lower resistance offered by the material to be ground to the rotation of a thin cutter blade allows a motor speed of about 15,000 r.p.m. instead of 12,000 r.p.m. with the same type of motor. The grinding efficiency being approximately a function of the square of the rotational speed, it is quite understandable that the above described grinding machine has a shorter time to work for doing the same task, which results in reduced heating and wear. These results are due to the particular arrangement of the cutter blade on the motor shaft in a machine according to the invention. Various changes may be made in the construction without departing from the scope of said invention as described above and illustrated in the attached drawing, by way of non-limiting examples.

What I claim is:

1. In a high speed cutting apparatus in combination, a shaft having an end portion of a given diameter and being adapted to be rotated at high speed about its axis; a thin cutting blade being formed with a central aperture having substantially the same cross section through the whole thickness of said blade and being of such size that the greatest circle which can be inscribed therein has a diameter greater than said given diameter of said shaft end portion, said cutting blade being mounted on said shaft with the whole surface defining said aperture surrounding said end portion of said shaft and with the end portion of the latter protruding with clearance through said aperture; and means fixed to said shaft and engaging said mounted blade at points spaced from the shaft axis a distance greater than the radius of said end portion thereof to center said blade aperture with respect to the shaft axis and to connect said blade with said shaft for rotation therewith without the edge of the aperture in said blade engaging said shaft end portion.

2. In a high speed cutting apparatus in combination, a shaft having an end portion of a given diameter smaller than the diameter of the remainder of said shaft so as to form a shoulder at the attached end of said end portion and being adapted to be rotated at high speed about its axis; a thin cutting blade being formed with a central aperture of such size that the greatest circle which can be inscribed therein has a diameter greater than said given diameter of said shaft end portion and smaller than the diameter of the remainder of said shaft, said cutting blade being mounted on said shaft with the end portion of the latter protruding with clearance through said aperture and with a portion of one face of said blade resting on said shoulder; and means fixed to said shaft and having a bottom face engaging the other face of said blade for pressing said blade against said shoulder and having a plurality of engaging portions protruding beyond said bottom face thereof and engaging said blade at points spaced from the shaft axis a distance greater than the radius of said end portion thereof to center said blade aperture with respect to the shaft axis and to connect said blade with said shaft for rotation therewith without the edge of the aperture in said blade engaging said shaft end portion.

3. In a high speed cutting apparatus in combination, a shaft having an end portion of a given diameter smaller than the diameter of the remainder of said shaft so as to form a shoulder at the attached end of said end portion and being adapted to be rotated at high speed about its axis; a thin cutting blade being formed with a central aperture of such size that the greatest circle which can be inscribed therein has a diameter greater than said given diameter of said shaft end portion and smaller than the diameter of the remainder of said shaft, said cutting blade being mounted on said shaft with the end portion of the latter protruding with clearance through said aperture and with a portion of one face of said blade resting on said shoulder; and plate means fixed to said shaft and having a bottom face engaging the other face of said blade for pressing said blade against said shoulder and having a plurality of engaging edge portions protruding beyond said bottom face thereof and engaging said blade at outer opposite edge portions thereof to center said blade aperture with respect to the shaft axis and to connect said blade with said shaft for rotation therewith without the edge of the aperture in said blade engaging said shaft end portion.

4. In a high speed cutting apparatus in combination, a shaft having an end portion of a given diameter smaller than the diameter of the remainder of said shaft so as to form a shoulder at the attached end of said end portion and being adapted to be rotated at high speed about its axis; a thin cutting blade being formed with a central aperture of such size that the greatest circle which can be inscribed therein has a diameter greater than said given diameter of said shaft end portion and smaller than the diameter of the remainder of said shaft and at least two additional apertures arranged laterally from said central aperture, said cutting blade being mounted on said shaft with the end portion of the latter protruding with clearance through said central aperture and with a portion of one face of said blade resting on said shoulder; and means fixed to said shaft and having a bottom face engaging the other face of said blade for pressing said blade against said shoulder and having a plurality of engaging portions protruding beyond said bottom face thereof and passing respectively through said additional apertures to center said central blade aperture with respect to the shaft axis and to connect said blade with said shaft for rotation therewith without the edge of the aperture in said blade engaging said shaft end portion.

5. In a high speed cutting apparatus in combination, a shaft having an end portion of a given diameter smaller than the diameter of the remainder of said shaft so as to form a shoulder at the attached end of said end portion and being adapted to be rotated at high speed about its axis; a thin cutting blade being formed with a central multi-sided aperture of such size that the greatest circle which can be inscribed therein has a diameter greater than said given diameter of said shaft end portion and smaller than the diameter of the remainder of said shaft, said cutting blade being mounted on said shaft with the end portion of the latter protruding with clearance through said aperture and with a portion of one face of said blade resting on said shoulder; and means fixed to said shaft and having a bottom face engaging the other face of said blade for pressing said blade against said shoulder and having a plurality of engaging portions protruding beyond said bottom face thereof and engaging said blade at opposite side edges of said multi-sided central aperture to center said blade aperture with respect to the shaft axis and to connect said blade with said shaft for rotation therewith without the edge of the aperture in said blade engaging said shaft end portion.

6. In a high speed cutting apparatus in combination, a shaft having a threaded end portion of a given diameter smaller than the diameter of the remainder of said shaft so as to form a shoulder at the attached end of said end portion and being adapted to be rotated at high speed about its axis; a thin cutting blade being formed with a central aperture having substantially the same cross section through the whole thickness of said blade and being of such size that the greatest circle which can be inscribed therein has a diameter greater than said given diameter of said shaft end portion and smaller than the diameter of the remainder of said shaft, said cutting blade being mounted on said shaft with the whole surface defining said aperture surrounding said end portion of said shaft and with the end portion of the latter protruding with clearance through said aperture and with a portion of one face of said blade resting on said shoulder; and means screwed onto said threaded end portion engaging the other face of said blade for pressing said blade against said shoulder and engaging said mounted blade at points spaced from the shaft axis a distance greater than the radius of said end portion thereof to center said blade aperture with respect to the shaft axis and to connect said blade with said shaft for rotation therewith without the edge of the aperture in said blade engaging said shaft end portion.

7. A high-speed cutting apparatus as defined in claim 2 in which said blade is formed from a material harder and that means from a material softer than the material of said shaft.

References Cited in the file of this patent

UNITED STATES PATENTS

| | | |
|---|---|---|
| 2,576,802 | Morris | Nov. 27, 1951 |
| 2,577,353 | Naidu et al. | Dec. 4, 1951 |
| 2,707,080 | Pezzillo | Apr. 26, 1955 |
| 2,771,111 | Seyfried | Nov. 20, 1956 |
| 2,795,443 | Gratzmuller | June 11, 1957 |